June 4, 1929.  R. J. POMEROY  1,715,510
METHOD OF MAKING COMPOSITE PICTURES
Filed Feb. 7, 1927
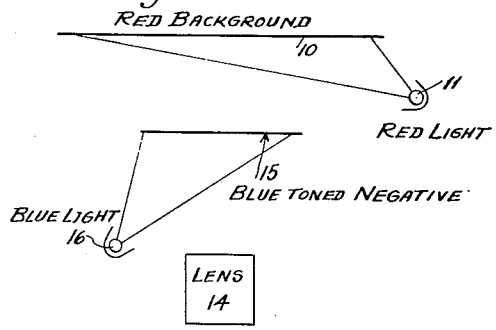
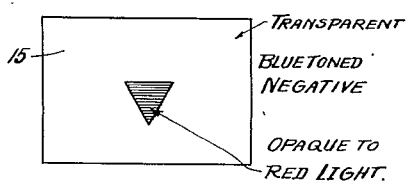
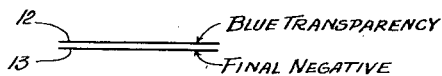
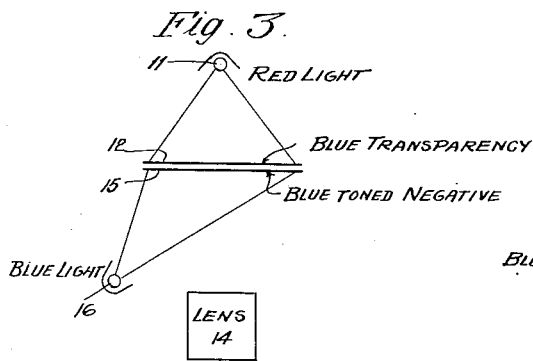
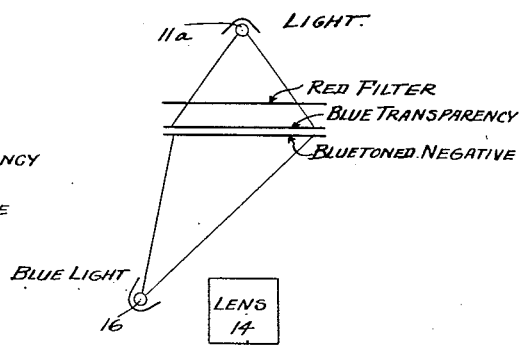
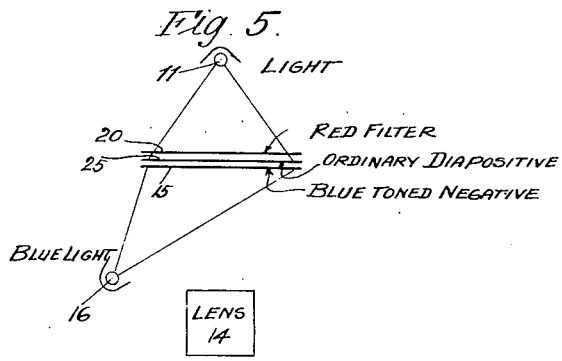
Inventor
Roy J. Pomeroy.
Attorney.

Patented June 4, 1929.

1,715,510

UNITED STATES PATENT OFFICE.

ROY J. POMEROY, OF LOS ANGELES, CALIFORNIA, ASSIGNOR OF ONE-HALF TO PARAMOUNT FAMOUS LASKY CORPORATION, OF LOS ANGELES, CALIFORNIA, A CORPORATION OF NEW YORK.

METHOD OF MAKING COMPOSITE PICTURES. REISSUED

Application filed February 7, 1927. Serial No. 166,302.

This invention has to do with methods of making composite pictures by photography, and in certain aspects, although not exclusively, includes improvements upon or variations of my method of producing composite photographs for which on December 19, 1925, I filed application Serial No. 76,423. In said application I have described a method of making composite photographs by the use of a transparent colored image of one component, the final negative being exposed simultaneously to that transparent image, illuminated by light of a complementary color, and to the object which is to form the other component of the picture illuminated by light of substantially the same color as the transparent image; the transparent colored image playing a part in the selective action that exposes two different parts of the final film each exclusively to the desired component. Although the present invention is not limited to being merely an improvement upon said prior method, in certain aspects it is an object of the present invention to provide specifically a method whereby, using complementary illuminations, and a colored transparent image, a composite photograph may be produced entirely from previously taken films. A broader object, however, is to provide a simple, accurate and inexpensive method whereby such a composite photograph may be produced entirely from previously taken films, not necessarily limited to the use of such a colored transparency as hereinbefore referred to. And in this broader aspect of my present invention I may use, for instance, an ordinary black and white diapositive of one component, say a background scene, and, by using selected light for illuminating that image and also selected light for illuminating the photographic image of the other component, produce the desired composite photograph.

An improved method, somewhat similar to some of the aspects of the one herein to be described, involving the use of an ordinary black and white diapositive instead of the colored transparency, is the subject matter of a companion application entitled "Method of making composite pictures", filed on even date herewith, Serial Number 166,301. The characteristic distinction between the method of that application and the method of this present application lies in the fact that specifically said companion application sets forth the use of two color filters acting on divided or split light beams, to accomplish selective final exposure of the final film.

The present invention will be best understood from the following discussion of several typical varying forms of the method, reference for this purpose being had to the accompanying drawings, in which:

Fig. 1 is a diagram illustrating one form of optical arrangement for my present method;

Fig. 2 is a view illustrating what I term a blue toned negative which may be used in the present method;

Fig. 3 is a diagram illustrating another optical arrangement, and

Figs. 4 and 5 are similar diagrams illustrating further variations of optical arrangements suitable to the method.

In Fig. 1 I illustrate at 10 a red background illuminated by a red light 11. This is merely one typical means of providing illumination of a certain selected color for the blue transparency 12, which is placed in any focal plane, as for instance directly before the final negative 13, as shown in Fig. 1. Lens 14 is focused upon the focal plane of a blue toned negative 15 and upon the focal plane of final negative 13, the blue toned negative being illuminated by blue light from illuminator 16.

The blue transparency 12 may be the same as that described in my said prior application and is a blue transparent image of one of the components, say the background. It will be understood that the methods herein described are capable of composing any two components whatever their natures may be, and whether or not either or both of them involve motion; but for sake of simplicity I am describing the methods as applied to a simple and typical instance of composing the image of an object with the image of a background. Likewise, although I specifically refer to the use of red and blue lights, a blue transparency and a blue toned negative, it will be understood from the discussion hereinafter that such specific selected colors are not limitations upon the invention. I have used a red transparency with very good results; perhaps even better than the blue transparency.

Assuming that the blue transparency 12 is an image of a background scene, it may be made as follows: An ordinary negative of the desired background is first made. From this negative a positive is printed in bichromated gelatin so as to get what is known as a bichromated gelatin image, the printing of the positive preferably being done through the celluloid or other base of the positive so that the outer face of the bichromated gelatin remains comparatively soft, to be dissolved away by a warm water wash and thus produce a gelatin relief, as is well known. This gelatin relief positive is next dyed with a suitable dye, and for the selected color I have found that a mixture of naphthol green and what is known as patent blue (alphazurine) gives a suitable blue color, renders the gelatin image very transparent and of almost if not quite uniform transparency to blue light over the whole surface of the positive, only the depth of the blueness varying. If this positive is illuminated with blue light, for instance, held to the light with a blue filter interposed, the dye image substantially disappears. However, if it is illuminated with light that is minus blue, say a selected red light, the transparent blue positive is in appearance immediately transformed into a black and white positive, substantially the same in appearance as an ordinary black and white positive made from the original negative.

Blue transparencies made in the manner above stated I have found to be sufficiently uniformly transparent to blue light to serve my purposes completely. However, if the transparency is not sufficiently uniform, that condition may be corrected by superposing a yellow transparent corresponding negative—a negative made in the same manner as the blue positive but colored a selected yellow. This particular feature is however not claimed here, being a part of the subject matter of my prior application.

If it be desired to use a red transparency the dyeing, I find, can be done very well with safranine; the other steps in preparing the transparency being the same as above set out. Of course if a red transparency is used, the illumination colors, as applied to the two components, will be relatively reversed.

The blue toned negative shown at 15 is one that has been made of the object component taken preferably before a black or non-actinic background so that the field of the resultant negative is transparent. This negative is then for instance toned blue in any suitable manner. For instance, it is first bleached as with ferricyanide and then chemically toned blue with an iron salt, as for instance iron chloride. The image on this negative being thus of a general blue color that image as a whole is substantially opaque to red light. At the same time it is capable of reflecting blue light as a positive, the reflective blue background being deeper in those parts that were originally most affected by light when the negative was first exposed. Consequently we thus have in the negative 15 an image that is substantially or quite completely opaque to the red light that comes from red background 10, but is reflective (as a positive) of the blue light from illuminator 16. The transparent ground of the blue toned negative will not reflect blue light to any extent. The blue light reflected from the face of the object image, passing through lens 14 and falling upon blue transparency 12 passes through that blue transparency substantially as if the transparency were perfectly uniform, and therefore the blue light from negative 15, reflecting as a positive, imprints a negative image upon final negative 13. At the same time the red light passing through the transparent portions of negative 15 and falling upon blue transparency 12 imprint upon final negative 13 all those portions except that blocked out by the image on negative 15. The result is a true and accurate composition of the two components in negative 13.

Now in the aspect of my invention presented by the method of Fig. 1 it will be seen that the characteristic of negative 15 is that its image shall be opaque to the light used to illuminate the blue transparency 12 while at the same time its image shall be reflective of light that will pass uniformly through the blue transparency. These characteristics may be attained in manners other than by using what I term a blue toned negative. For instance, a negative simply bleached out to a white or whitish color will answer to a certain extent as such a bleached negative has a more or less uniform opaque whiteness throughout its image with a varying reflectivity for any kind of light. However, I find it easiest to achieve practical results by toning that negative substantially to the color that is selected for transparency 12 as it is therefore more highly reflective as a positive of light of that same color, and is more easily made substantially opaque to a complementary or relatively minus color.

I have said that the blue transparency 12 may be placed in any focal plane and in Fig. 3 I show it in the focal plane along with the blue toned negative 15 illuminated from behind by the red illuminator 11. The results of this arrangement will be seen to be exactly the same as the results in Fig. 1; there is no distinction in results, whether the opaque image of the blue tone negative cuts off the illuminating light of the blue transparency before or after that light passes to or through the blue transparency. Thus the blue transparency may be in my present method arranged in either focal plane of the printing or exposure apparatus and the same practical results obtained. Placing it in either focal plane is, in effect, superposing it on the blue toned negative. In my former method (S. N. 76,423), it was not practical to make an arrangement corresponding to that of Fig. 3, not because of theoretic impossibility but simply because of the impracticability of making a blue transparency of a size to correspond with the actual component object of which an exposure was being made.

Fig. 4 shows a further variation in which a light 11ᵃ of any color including red, say white, may be used behind blue transparency 12, a red filter 20 being used between the light and the transparency.

In Fig. 5 I finally illustrate how this method may be carried out without the use of the blue transparency 12. For instance, behind the blue toned negative 15 I place an ordinary diapositive 25 of the background component, illuminating that with light of a suitable color and to which the image of negative 15 is opaque. For reasons before stated, using the blue toned negative, the illuminating light for this diapositive will then be red; and that can be obtained by the use of a red light or the use of a red filter 20, or both. As before, negative 15 will be illuminated on its face for reflection as a positive, blue light being here chosen because it is best reflected by the blue toned negative. The final negative 13 is then exposed as before, the results being the same as those obtained in Figs. 3 and 4. The red light that passes through diapositive 25 is blocked out by the opaque image of negative 15, otherwise passing through the transparent field of that negative to form on final negative 13 an image of the background except in those parts occupied by the image of the object taken by reflection from negative 15. Thus when the background positive is placed in a position that may be described as "outside" the object negative, it will be seen that it is of no material consequence what kind of a positive is used; that is, it is not necessary to have a positive of any selected color. And as I have said before, it is only necessary that negative 15 be opaque or substantially opaque in its image to the light that is used to illuminate the positive. And thus, as I have before mentioned, negative 15 may have, for instance, a white bleached image that is substantially opaque to white light and reflective of white as a positive. Consequently it may be practicable in some instances to use such a white bleached negative at 15 and to use white light at both illuminators 11 and 16; but for the reasons hereinbefore stated I prefer to use some certain selected color for the tone of negative 15 and then let that negative reflect light of substantially the same color and block out light which has a minus relation to that color.

I claim:

1. The method of producing a composite photograph embodying two component parts, that includes making a transparent image of one component, making an image of the other component substantially uniformly opaque to light but reflective of light to show its image details, superposing the two images and illuminating the first image by transmitted light and the second mentioned image by reflected light, and exposing a fresh actinic surface to the first image and the second image so illuminated and superposed.

2. The method of producing a composite photograph embodying two component parts, that includes making an image of one component, making an image of the other component substantially uniformly opaque to light of a selected color and reflective of light of another selected color, superposing the two images, illuminating the first mentioned image with light of the color to which the second mentioned image is opaque and illuminating the second mentioned image with the light to which it is reflective, and exposing a fresh actinic surface to the superposed illuminated images.

3. The method of producing a composite photograph embodying two component parts, that includes making a transparent image of one component, making an image of the other component opaque to light of a selected color and reflective of light of another selected color, superposing the two images, illuminating the first mentioned image by transmission with light of the color to which the second mentioned image is opaque and illuminating the second mentioned image reflectively with the light to which it is reflective, and exposing a fresh actinic surface to the superposed illuminated images.

4. The method of producing a composite photograph embodying two component parts, that includes superposing images of the two components, one of the images being illuminable by light of a selected color, the other being substantially opaque to that said light and reflective of light of another color, illuminating the images with the lights with which they are respectively illuminable, and exposing a fresh actinic surface to them.

5. The method of producing a composite photograph embodying two component parts, that includes making a photographic image of one component toned in a selected color, superposing that image on an image of the other component, illuminating the second mentioned component with light of a minus relation to the first mentioned color, illuminating the first mentioned image reflectively with light of the first mentioned color, and exposing a fresh actinic surface to the superposed images.

6. The method of producing a composite photograph embodying two component parts, that includes making a photographic image of one component toned in a selected color, making an image of the other component substantially uniformly transparent to light of the selected color, superposing the images, illuminating the first mentioned image reflectively with light of said first mentioned color and illuminating the second mentioned image with light of a color having minus relation to the selected color, and exposing a fresh actinic surface to the two images so superposed and illuminated.

7. The method of producing a composite photograph embodying two component parts, that includes making a photographic image of one component toned in a selected color so as to be reflective of light of that color and substantially uniformly opaque to light of a color minus in relation to the selected color, making a photographic transparent color image of the other component in the first mentioned color, said second mentioned image being substantially uniformly transparent to light of its color but varyingly opaque to light of the minus relation color, superposing the two images, illuminating the first mentioned image reflectively with light of said first mentioned color and illuminating the second mentioned image transmissively with light of the color having a minus relation to the first mentioned color, and exposing a fresh actinic surface to the two images so superposed and illuminated.

In witness that I claim the foregoing I have hereunto subscribed my name this 22 day of January, 1927.

ROY J. POMEROY.